July 24, 1956 — R. E. POWELL — 2,756,308
ELECTRIC WELDER
Filed March 25, 1954
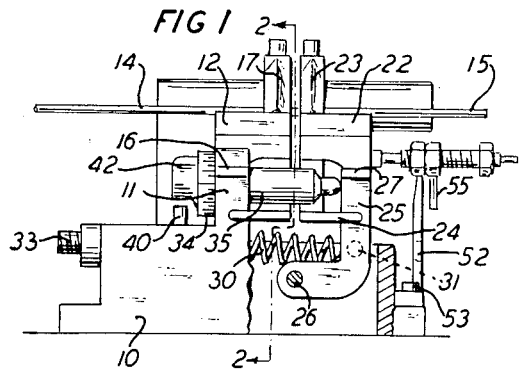
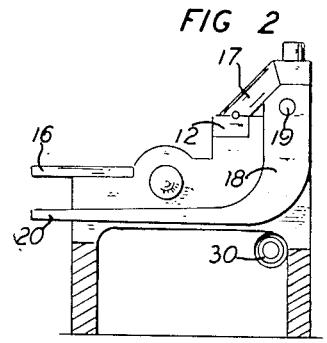
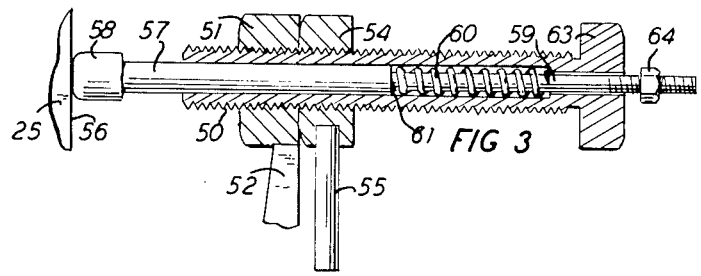
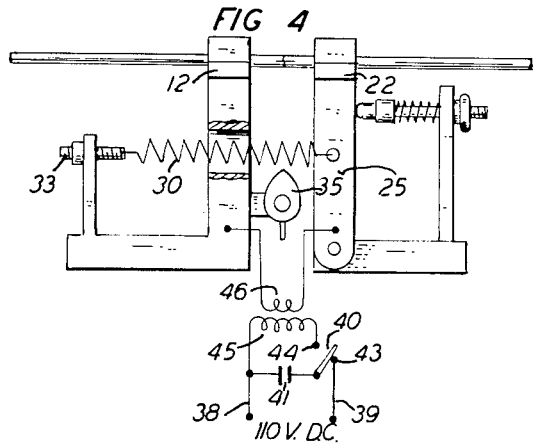
INVENTOR
R. E. POWELL
BY
*W. C. Parnell*
ATTORNEY United States Patent Office 2,756,308
Patented July 24, 1956

2,756,308
ELECTRIC WELDER

Raymond E. Powell, Westfield, N. J., assignor to Western Electric Company, Incorporated, New York, N. Y., a corporation of New York Application March 25, 1954, Serial No. 418,504

4 Claims. (Cl. 219—4)

This invention relates to attachments for welding apparatus and more particularly to attachments for apparatus for butt welding wires.

In the manufacture of aluminum conductor cables for the telephone industry, commercial machines, of the type shown in the patent to C. L. Pfeiffer 2,018,379, have been used with one essential difference, that being the use of stored energy in condensers rather than line power directly. The welding apparatus of the type shown in the above Pfeiffer patent, butt welds larger wires successfully but, in the welding of small wires, such as .025 and .032 inch, diameter, it has been found that the force embodied in the spring for moving one electrode toward another is very satisfactory during the main portion of the welding operation after the weld gets under way, but this force is not adequate to overcome standing inertia of the relatively bulky movable structure associated with the spring and irregularities existing at the ends of the wires to be welded. These factors of the welder become more and more important with the decreasing sizes of the wires. As a result, the welding current which is of only a few milliseconds duration, frequently burns off the ends of the wires and has expended itself before the arm for the movable electrode has moved from its pre-weld state of rest. Attempts have ben made through the use of a square shear process to produce perfect ends for the wires but frequently slight irregularities remain on the ends of the wires which prevent the two wire ends from fraying. A slight irregularity separating the wires, burns off explosively giving the movable electrode still less opportunity of moving before the current is expended.

An object of the invention is to improve the operation of such welders when use for fine wires.

With this and other objects in view, the invention comprises an attachment for a welding apparatus having a fixed electrode and a spring actuated movable electrode included in a welding circuit with materials to be welded removably held thereby in pressure contact, the attachment comprising an element adapted to apply an added initial force to the movable electrode to increase the initial contact pressure between the materials.

In one embodiment the attachment comprises a second spring acting on the movable electrode but limited to a very short travel so that after the electrode has been set into motion, the weld proceeds to completion under normal contact pressure.

Other objects and advantages will be apparent from the following detailed description when considered in conjunction with the accompanying drawing, wherein:

Fig. 1 is a front elevational view of a welding apparatus showing the attachment mounted thereon;

Fig. 2 is a vertical sectional view taken along the line 2—2 of Fig. 1;

Fig. 3 is a vertical sectional view of the attachment, and

Fig. 4 is a schematic front elevational view of the apparatus and the attachment including the welding circuit.

The apparatus selected to illustrate the invention includes a main frame or housing 10 having a vertically extending member 11 supporting a fixed electrode 12, suitably grooved to receive a wire 14, the end of which is to be welded to a wire 15. The member 11 has a laterally extending portion 16 which may be utilized by the operator when actuating a clamp 17 relative to the electrode 12. The clamp 17 is mounted on a lever 18 pivoted at 19 and having its foremost end 20 lying substantially parallel with the projection 16 so that when both are gripped by the operator, the lever 18 may be actuated, readily moving the clamp 17 into open position to free a welded wire and to insert another wire in place to be welded.

A movable electrode 22, similar in structure to the fixed electrode 12, with a suitable groove therein for the wire 15 is provided with a clamp 23, identical with the clamp 17, and supported by a lever 24 substantially identical in structure to the lever 18. The electrode 22 is mounted on the upper end of a member 25 supported for movement about its pivot 26 and having a projection 27 similar to the projection 16 to be gripped with the leading end of the lever 24 in actuating the clamp 23 about its pivot (not shown) to free a welded wire and to receive a new wire to be welded. A spring 30 having one end fixed to the member 25 at 31 and the other end fixed to an adjustable screw 33 carried by the frame 10, supplies the normal force to move the ends of the materials or wires toward each other through movement of the member 25 and the movable electrode 22 during the welding operation. A dial type member 34 mounted in an aperture (not shown) in the member 11, actuates a locating element 35 to move the member 25, the movable electrode 22 and their associated parts into the loading position where the wires 14 and 15 will be placed in the electrodes. The element 35 is represented by a cam, bearing the same reference numeral in Fig. 4, and the other like parts of the apparatus, although different in appearance, bearing their corresponding reference numerals. The welding circuit illustrated in Fig. 4 includes lines 38 and 39 from a 110 v. direct current supply. A switch 40, shown normally closed, completes a circuit through a condenser 41 to become charged. The switch 40, illustrated in Fig. 1 by the projection extending upwardly from the frame 10, is positioned to be actuated by a portion 42 of the element 34 when moved to free the element 35 from the member 25. This action moves the switch 40 from contact 43 to contact 44 so that the energy stored in the condenser 41 may be discharged through the primary winding 45 of a transformer, the secondary winding 46 of which has its leads connected to the portions supporting the electrodes 12 and 22.

The attachment shown in Figs. 1 and 4 and more clearly in Fig. 3 includes a tubular member 50 which is threaded externally for adjustment longitudinally in an internally threaded support 51. The support 51 is an integral portion of a bracket 52 mounted at 53 in any suitable manner upon the frame or housing 10 of the apparatus. A locking nut-like member 54 disposed on the threaded tube 50 has an arm 55 fixed thereto so that adjustment of the tube 50 may be made readily relative to a surface 56 of the member 25. A plunger type element 57 is slidable freely in the tube 50 and provided with an insulated nose 58 at its outer end to engage the surface 56. The other end or portion of the element 57 is reduced as shown at 59 to receive a spring 60 concentric therewith applying its force against a shoulder 61 to add this force through the element 57 to the movable electrode or support 25 therefor. A head 63 integral with the tube 50 may be utilized in rotating the tube in its support 51 for adjustment relative to the member 25 so that when the member 25 is moved into its loading position, the nose 58 of the element 57 will have been engaged and moved longitudinally a predetermined distance, moving a collar or nut 64, which is mounted on the threaded end of the element 57, away from the portion 63.

Considering now the operation of the welding apparatus with the attachment, let it be assumed that the attachment has been adjusted relative to the member 25 and that the nut or collar 64 has been adjusted on the threaded end of the element 57 to render the attachment effective for only a given portion of the movement of the movable electrode during the welding operation. This having been accomplished, the operator is free to carry out the successive steps of opening the welding apparatus through actuation of the dial member 34, feeding materials such as wires 14 and 15 to the electrodes 12 and 22 until their ends engage each other and returning the dial member 34 to its starting position to actuate the switch 40. It will be noted that during movement of the dial member 34 to open the welding apparatus, the switch 40, which may be defined as a normally closed switch with respect to contact 43, will have been freed to move into its closing position so that the condenser 41 may be charged. Therefore, movement of the dial member 34 to its normal position to free the element 35 from the member 25 will actuate the switch 40 into engagement with its contact 44, completing the welding circuit and permitting the energy stored in the condenser to be discharged through the transformer, the electrodes and the abutting ends of the wires.

The important function of the attachment is the provision of the added initial force of spring 60 applied to the movable electrode, or the support 25 thereof, giving this portion of the welding apparatus the necessary shove to overcome the standing inertia of the movable structure of the apparatus and to overcome the retarding results of irregularities in the abutting ends of the wires, thus causing immediate starting of the desired action of the welding processes made possible by the spring 30 without any loss of time or motion normally resulting from the aforementioned undesirable conditions.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An attachment for a welding apparatus having a fixed electrode and a movable electrode actuated by the force of a spring and included with the fixed electrode in a welding circuit with materials to be welded removably held thereby in pressure contact, the attachment comprising means to overcome any irregularities in the engaging surfaces of the materials including a force applying unit, means to support the unit to cause it to apply its force to the movable electrode, and means to render the unit ineffective after the irregularities have been overcome, whereby the additional and final movements of the movable electrode are under the force of the spring.

2. An attachment for a welding apparatus having a fixed electrode and a movable electrode actuated by the force of a spring and included with the fixed electrode in a welding circuit with materials to be welded removably held thereby in pressure contact, the attachment comprising an element actuable to apply an added force to the movable electrode to overcome the standing inertia thereof, and means to terminate the added force of the element after movement of the movable electrode is started and short of the full movement thereof by the force of the spring.

3. An attachment for a welding apparatus having a fixed electrode and a movable electrode actuated by the force of a spring and included with the fixed electrode in a welding circuit with materials to be welded removably held thereby in pressure contact, the attachment comprising an element adapted to apply an added initial force to the movable electrode to increase the initial contact pressure between the materials, means effective after a predetermined movement of the movable electrode short of the full movement thereof by the force of the spring for disabling the pressure increasing element, and means to vary the said added initial force.

4. An attachment for a welding apparatus having a fixed electrode and a movable electrode actuated by the force of a spring and included with the fixed electrode in a welding circuit with materials to be welded removably held thereby in pressure contact, the attachment comprising an element adapted to apply an added initial force to the movable electrode to increase the initial contact pressure between the materials, means effective after a predetermined movement of the movable electrode short of the full movement thereof by the force of the spring for disabling the pressure increasing element, means to vary the said added initial force and means to vary the point of termination of the added initial force with respect to the distance of movement of the movable electrode.

References Cited in the file of this patent
UNITED STATES PATENTS

| | | |
|---|---|---|
| 2,018,379 | Pfeiffer | Oct. 22, 1935 |
| 2,387,067 | Heath et al. | Oct. 16, 1945 |